(12) United States Patent
Vambenepe et al.

(10) Patent No.: US 7,945,860 B2
(45) Date of Patent: May 17, 2011

(54) SYSTEMS AND METHODS FOR MANAGING CONVERSATIONS BETWEEN INFORMATION TECHNOLOGY RESOURCES

(75) Inventors: Guillaume N. Vambenepe, Mountain View, CA (US); Nicolas Catania, Palo Alto, CA (US); Bryan P. Murray, Duvall, WA (US); M. Homayoun Pourheidari, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2732 days.

(21) Appl. No.: 10/438,576

(22) Filed: May 14, 2003

(65) Prior Publication Data
US 2004/0230650 A1 Nov. 18, 2004

(51) Int. Cl.
*G06F 3/048* (2006.01)
(52) U.S. Cl. ...................................................... 715/744
(58) Field of Classification Search .................. 709/223, 709/224, 204; 707/10, 103 R; 705/7; 719/328; 717/101; 715/744, 735, 765
See application file for complete search history.

(56) References Cited

U.S. PATENT DOCUMENTS

| | | | |
|---|---|---|---|
| 6,434,568 B1* | 8/2002 | Bowman-Amuah | 707/103 R |
| 7,020,697 B1* | 3/2006 | Goodman et al. | 709/223 |
| 2003/0126136 A1* | 7/2003 | Omoigui | 707/10 |
| 2004/0064351 A1* | 4/2004 | Mikurak | 705/7 |
| 2004/0103186 A1* | 5/2004 | Casati et al. | 709/224 |
| 2004/0230650 A1* | 11/2004 | Vambenepe et al. | 709/204 |
| 2004/0230943 A1* | 11/2004 | Pourheidari et al. | 717/101 |
| 2004/0237094 A1* | 11/2004 | Vambenepe et al. | 719/328 |

* cited by examiner

*Primary Examiner* — Le Luu

(57) ABSTRACT

A system for managing a conversation includes one or more interfaces configured to provide management information about the conversation to a manager. The interface can be configured to provide information regarding a resource such as a Web service that contains the conversation. Information regarding the conversation that may be made available to the manager includes the number of failed messages processed by the conversation; the number of successful messages processed by the conversation; the total number of messages processed by the conversation; the number of other resources participating in the conversation; the identity of other resources participating in the conversation; an identifier of the conversation; the last message received; the last fault message received; and an identifier of the resource that contains the conversation.

35 Claims, 4 Drawing Sheets

SYSTEMS AND METHODS FOR MANAGING CONVERSATIONS BETWEEN INFORMATION TECHNOLOGY RESOURCES

RELATED APPLICATIONS

The disclosed system and operating method are related to subject matter disclosed in the following co-pending patent applications that are incorporated by reference herein in their entirety: (1) U.S. patent application Ser. No. 10/438,716 entitled "System and Method for Managing Web Services"; and (2) U.S. patent application Ser. No. 10/438,662 entitled "System and Method for Managing Information Technology Resources".

COMPUTER PROGRAM LISTING APPENDIX

This specification includes Appendix A (consisting of three text files) on CD-ROM, which contains interface description documents that can be used with some embodiments of the invention. The files on the compact discs are as follows:

1. Conversation Interfaces Description.wsdl (12 KB created May 14, 2003);
2. Event Interfaces Description.wsdl (10 KB created May 14, 2003); and
3. Managed Object Interfaces Description (22 KB created May 14, 2003).

Appendix A is incorporated herein by reference.

BACKGROUND

The term Web services describes an approach to distributed computing in which interactions are carried out through the exchange of eXtensible Markup Language (XML) messages. Web services can perform any task that can be described and contained within one or more modules of code. For example, functions such as language translation or currency conversion, performing calculations for medical claims processing, and handling certain aspects of travel planning can be implemented in a Web service. Essentially any transaction or bit of business logic can become a Web service if it can be accessed and used by another system over a network such as the Internet.

A Web service is a software system identified by a Universal Resource Identifier (URI) whose public interfaces and bindings are typically defined and described in an XML document. The description can be discovered by other software systems. These systems may then interact with the Web service in a manner prescribed by its definition, using XML based messages conveyed by Internet protocols.

The Web services architecture is based upon the interactions between three primary roles: service provider, service registry, and service requestor. These roles interact using publish, find, bind and other operations. The service provider is the business that provides access to the Web service and optionally publishes the service description in a service registry. The service requestor finds the service description optionally in a service registry and uses the information in the description to bind to a service.

Web services typically send XML messages formatted in accordance with the Simple Object Access Protocol (SOAP) specification. The SOAP specification is a universally agreed-upon protocol that uses XML and optionally HTTP together to invoke functions exposed in Web services.

The XML messages are described using the Web Services Description Language (WSDL) specification, which, along with the optional Universal Description Discovery and Integration (UDDI) registry, provides a definition of the interface to a Web service and identifies service providers in a network. The WSDL specification is an XML-based language used to define Web services and describe how to access them. An application trying to use a particular Web Service uses WSDL to find the location of the Web service, the function calls available, and the format that the client must follow to access the Web service. Therefore, the client first obtains a copy of the WSDL file and then uses the information in this file to format a request, often using SOAP.

The UDDI registry supports Web services by providing a place for a company to register its business and the Web services that it offers. Users that need a Web service can use this registry to find a business that provides the service.

Web services are highly extensible, interact in a loosely coupled manner, and are deployed and utilized via various standard specifications such as SOAP, WSDL, and UDDI. In particular, Web services allow businesses to create processes that span multiple enterprises and define networks based on business partnerships. Enterprises are adopting Web services technology to address their business integration needs, but currently there is no standard framework for managing Web services.

Web services have some characteristics that make them especially challenging to manage. One characteristic is that Web services work together to form a distributed application that may extend across an enterprise or even a worldwide network such as the Internet. The challenge is that there are many viewpoints from which to manage an application. The management challenges with a distributed application involve crossing boundaries of control and management domains while maintaining a unified, yet customized view for the distributed application. For instance, an IT manager may be interested in managing all of the services in a domain, which includes several computer systems. The vantage point is all Web services on a given computer system. In another instance, a process manager may be interested in all of the Web services that work together to drive a process to completion. This may involve Web services throughout an enterprise, or possibly Web services hosted by other companies. Still further, a business manager may be interested in all of the service agreements with the company regarding Web services hosted by other companies. The business manager will be interested in making sure the company meets its service agreements with others. Additionally, the service providers' performance in fulfilling the service agreements will be tracked to provide information for making future business decisions.

Another characteristic that presents management challenges is that Web services have been designed to be extensible at all levels. The SOAP protocol standard provides a very flexible mechanism to extend the processing of messages by adding headers to the message. Additionally, the body of the message may be any XML document that is understood by the Web service. The WSDL and XML-schema description standards provide a means to define arbitrary data types, and to extend or restrict previously defined data types. An XML-schema is a document that describes the valid format of an XML data-set, such as elements that are (and are not) allowed at any point; what the attributes for any element may be; and the number of occurrences of elements.

It is also possible for a Web service to provide several interfaces into its functionality. There are also discovery standards that provide their own extensibility mechanisms. The management challenges with such an extensible system include determining the type of a managed object and how to communicate with the object.

The UDDI standard allows WSDL documents to be discovered at run time. This discovery mechanism is not limited to use only within an enterprise, but is available wherever the Web service is available over a network, such as the Internet. Furthermore, it is possible to discover not only the basic capabilities of a Web service, but also the advanced capabilities that are specified by these standards. One management challenge with such a powerful discovery mechanism is to ensure that provided services are protected with the proper type of security. Another management challenge is identifying users accessing the provided Web services. Yet another more complex management challenge is that all appropriate service agreements are not only discoverable but also enforced.

SOAP and UDDI provide information about the Web services as they use the applications, but facilities are lacking that provide critical information on the state of the Web service as it is executing, and allow messages sent and receieved by the Web service to be managed.

SUMMARY

In one embodiment, a system for managing a conversation in a Web service includes a conversation managed object executable on a computer processor. The conversation managed object includes one or more interfaces configured to provide management information about the conversation to a manager. The interface is configured to provide information regarding the Web service that contains the conversation.

In another embodiment, a system capable of monitoring messages between a first resource and a second resource includes a computer processor configured to communicate with the first resource. The computer processor includes executable instructions operable to: discover whether a conversation has been established between the first resource and the second resource; end the conversation; and request information regarding the conversation. The information about the conversation that is available via the interface includes, for example, the number of failed messages processed by the conversation; the number of successful messages processed by the conversation; the total number of messages processed by the conversation; the number of other resources participating in the conversation; the identity of other resources participating in the conversation; an identifier of the conversation; the last message received; the last fault message received; and/or an identifier of the first resource that contains the conversation.

In a further embodiment, a computer program product comprises a conversation interface, and a managed object interface associated with the conversation interface. The conversation interface includes information for monitoring messages in a conversation, including the number of failed messages; the number of successful messages; the total number of messages; the identity of services participating in the conversation; the number of services participating in the conversation; an identifier of the conversation; the last message received by the managed service; the last fault message received by the managed service; and/or an identifier of the managed service that contains the conversation interface.

In a still further embodiment, a method for managing a conversation for a Web service includes creating a conversation object representing the conversation, exposing management capabilities for the conversation via a plurality of interfaces; and allowing a manager to subscribe with the conversation object to receive notification of events regarding the conversation.

Various other features and advantages of embodiments of the invention will be more fully understood upon consideration of the detailed description below, taken together with the accompanying figures.

DETAILED DESCRIPTION OF THE FIGURES

Figure 1A:
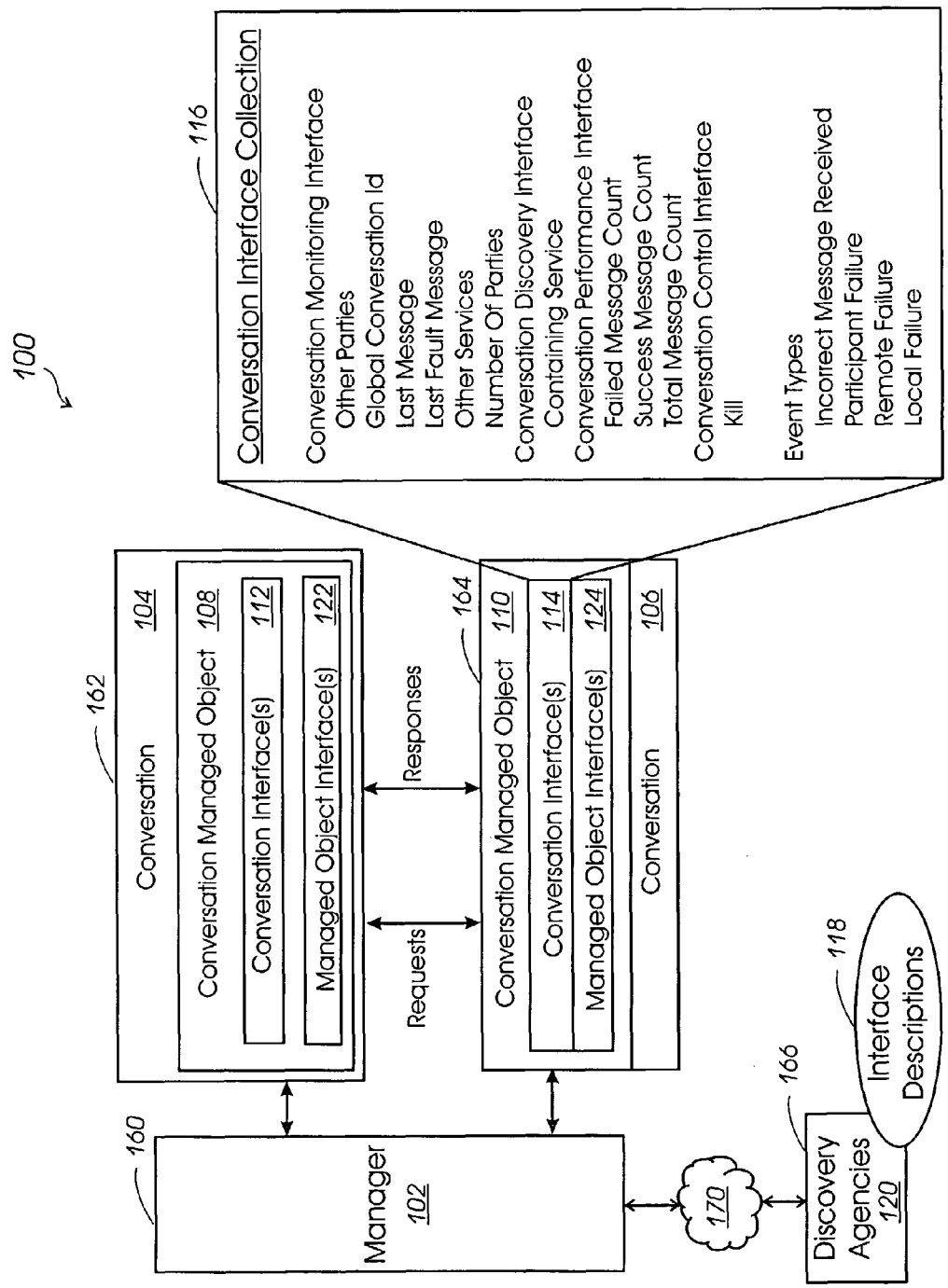
FIG. 1A is a diagram of components included in an embodiment of a conversation management system and a conversation interface collection.

Referring now to FIG. 1A, an embodiment of a conversation management system 100 that allows manager 102 to monitor and control one or more conversations 104, 106 is shown. Conversation managed objects 108, 110 represent the management features of resource(s) that conduct conversations 104, 106. Interfaces in one or more categories can be included in conversation interfaces 112, 114 for each conversation managed object 108, 110. Conversation interfaces 112, 114 allow manager 102 to access information regarding the state of messages related to corresponding conversations 104, 106.

In some embodiments, management capabilities provided via conversation interfaces 112, 114 include attributes that represent information about the messages; operations to support the management of conversations 104, 106; and events representing information, exceptions, and state changes that can be reported by conversation managed objects 108, 110 to manager 102. Conversation managed objects 108, 110 can be implemented as part of the implementation for conversations 104, 106, such as shown for conversation managed object 108, or in a layer external to conversations 104, 106, as shown for conversation managed object 110.

The term "conversation" is a set of related messages sent and received by a particular conversation. Conversations 104, 106 are typically invoked by other resources, such as Web services (not shown). The messages received by a particular conversation 104, 106 may be sent by more than one other conversation, and a particular resource, such as a Web service, can invoke multiple conversations that may or may not be related to the resource's other conversations.

Conversations 104, 106 populate data fields in conversation interfaces 112, 114 that are available to manager 102. Further, conversations 104, 106 receive information and control parameters from manager 102 via conversations interfaces 112, 114.

In some embodiments, conversations 104, 106 follow rules described by the Web Services Conversation Language (WSCL), which allows conversations 104, 106 to be defined in XML schema, and messages to be formatted according to XML specifications. WSCL specifies the XML messages to be exchanged, and the allowed sequence of the message exchanges. WSCL conversation definitions are XML documents that can be interpreted by Web services infrastructures and development tools. Other suitable programming languages can be utilized to implement conversations 104, 106.

In some embodiments, each collection of conversation interfaces 112, 114 supports various categories of management capabilities including monitoring, discovery, control, performance, configuration, and security. Other interfaces that support additional conversation management capabilities can be utilized, in addition to, or instead of, conversation interfaces 112, 114.

An embodiment of conversation interfaces 114 is represented in FIG. 1A as Conversation Interface Collection 116. Each interface in Conversation Interface Collection 116 includes at least one management feature that can be used by manager 102 to monitor and/or control the exchange messages between conversations 104 and 106. Conversation interfaces 112, 114 can include additional, fewer, or the same features shown in the embodiment of Conversation Interface Collection 116 in FIG. 1A.

In the embodiment shown, Conversation Interface Collection 116 includes a Conversation Monitoring Interface, a Conversation Discovery Interface, a Conversation Performance Interface, and a Conversation Control Interface. Conversation interfaces 112, 114 can be configured to support any one, a group, or all of the interfaces in Conversation Interface Collection 116.

Further, in some embodiments, manager 102 can discover interface descriptions 118 for conversation interfaces 112, 114 via a suitable discovery agency 120, such as UDDI or other suitable method. Interface descriptions 118 can be configured to reveal selected management information to manager 102 by exposing only selected interfaces in conversation interfaces 112, 114. For example, a description for conversation interfaces 114 may expose only the Conversation Monitoring Interface to manager 102.

Moreover, attributes in Conversation Interface Collection 116 can support types of access by other objects, such as read-only and read/write. When description documents 118 are implemented in WSDL, conversation interfaces 112, 114 are mapped to ports, and different operations are created based on the access policies of the attributes, as further described herein. Conversation Interface Collection 116 can also be extended to provide further management capabilities for manager 102, as further described herein.

In the embodiment shown in FIG. 1A, Conversation Monitoring Interface includes attributes for Other Parties, Global Conversation ID, Last Message, Last Fault message, Other Services, and Number of Parties.

The Other Parties attribute returns a list of other conversation managed objects participating in the corresponding conversation. For example, the Other Parties attribute in conversation managed object 110 returns an identifier for conversation managed object 108, and vice versa.

The Global Conversation ID attribute returns a globally unique identifier associated with conversation 106. The list of managed objects returned by the Other Parties attribute above return the same value for the Global Conversation ID. A different identifier indicates a different managed object. An example of a suitable identifier is a Universal Resource Identifier (URI) that can be used to identify resources in a domain including documents, images, downloadable files, services, electronic mailboxes, and other resources. Other suitable identifiers can be utilized.

The Last Message Received attribute represents the last message received by conversation 106.

The Last Message Sent attribute represents the last message sent by conversation 106.

The Last Fault Message Received attribute represents the last fault message received by conversation 106.

The Last Fault Message Sent attribute represents the last fault message sent by conversation 106.

The Other Services attribute represents a list of Service managed objects, which represent the other Web services or resources that are participating in conversation 106. The list returned represents the identities of the Web services or other resources that are parties to conversation 106.

The Number Of Parties attribute represents the number of other Web services or other resources involved in the conversation.

Conversation Discovery Interface can include a Containing Service attribute, which returns a globally unique identifier for the resource, such as a Web service that contains conversation 106.

Conversation Performance Interface can include attributes such as Failed Message Count, Success Message Count, and Total Message Count. Failed Message Count returns the number of failed messages processed by conversation 106. Success Message Count returns the number of successful messages processed by conversation 106. Total Message Count returns the total number of messages processed by conversation 106.

Conversation Control Interface can include a Kill operation to terminate conversation 106. Other conversation(s) 104 to which the killed conversation 106 is related may continue to exchange messages.

The embodiment of Conversation Interface Collection 116 shown also includes Event Types, such as Incorrect Message Received, Participant Failure, Remote Failure, and Local Failure. An Event represents a change in the state of a corresponding object, for example, conversation 106. Manager 102 can register to receive notification of one or more of the Event Types available in Conversation Interface Collection 116.

In the embodiment shown, Incorrect Message Received event indicates that an incorrect message was received by conversation 106. Participant Failure event indicates that either a message could not be sent to one of the participants in conversation 106, or an expected response was never received from one of the other participants. Remote Failure event indicates that one of the remote participants in conversation 106 sent an unexpected fault message. Local Failure event indicates that a fault happened while processing a message for conversation 106.

The preceding types, operations, and attributes are examples of features that can be included in Conversation Interface Collection 116. Other features can be implemented for Conversation Interface Collection 116 in addition to, or instead of, the preceding features. Further, the names for the interfaces, attributes, events, operations and other interface features disclosed herein are provided for purposes of illustration only. The same names can be used to represent different features, and other names can be implemented to represent features disclosed herein.

Figure 1B:
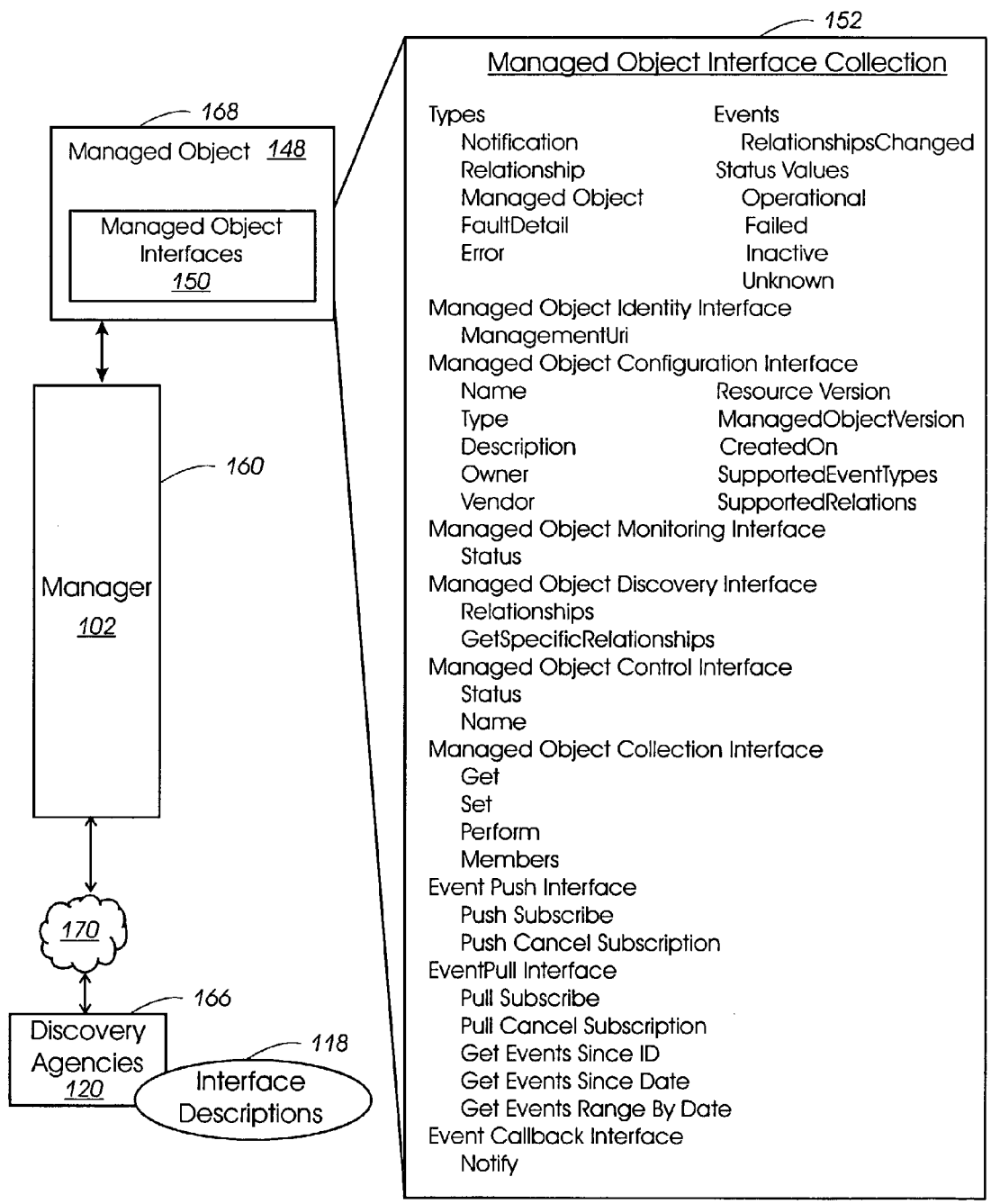
FIG. 1B is a diagram of components included in an embodiment of a managed object interface collection for the conversation management system of FIG. 1A.

FIG. 1A also shows managed object interfaces 122 associated with conversation managed object 108, and managed object interfaces 124 associated with conversation managed object 110. Referring to FIG. 1B, an embodiment of managed object 148 with managed object interfaces 150 is shown. Managed object 148 is a management representation of a resource. For example, conversation managed objects 108, 110 in FIG. 1A can each be considered managed objects 148.

Managed object 148 implements managed object interfaces 150 to provide a common set of basic management capabilities to monitor and/or control the underlying resource(s) represented by managed object 148 through various features such as attributes, operations, and event notifications.

Various implementations of managed object interfaces 150 can hide some or all of the management capabilities from managers 102 that are not authorized to access specific management capabilities.

Each managed object 148 inherits managed object interfaces 150, which can be implemented as part of each managed object 148, or in another layer outside of managed object 148. Each managed object 148 can also include one or more additional interfaces, based on the associated resources, that expose relevant information to manager 102. For example, conversation managed objects 108, 110 implement conversation interfaces 112, 114, as well as managed object interfaces 122, 124 (FIG. 1A).

Interface descriptions 118 for managed object interfaces 150 can be used in some implementations to expose management capabilities available for managed objects 148 to manager 102. Interface descriptions 118 can allow manager 102 to determine the objects that can be managed, the attributes, and relationships and topology of related managed objects 148. Managed object interfaces 150 can allow manager 102 to access information to monitor, audit, and control various aspects of managed objects 148, and to register to receive event notifications.

The embodiment of Managed Object Interface Collection 152 shown in FIG. 1B includes, among others, various event, types, attributes, operations, and status values that can be implemented in managed object interfaces 150.

Managed Object Configuration Interface includes Supported Relations, which is a read-only attribute that returns a list of the relations supported by managed object 148. Any of the relations in the list may be used in relationships managed object 148 has with other managed objects. For example, managed object 148 can support relations such as Contains, Contained In, Depends On, Depended Upon, and Corresponds To. Other suitable relations can be utilized. Further information regarding Managed objects 148 and managed object interfaces 150 is provided in the disclosure entitled "System and Method for Managing Web Services", U.S. patent application Ser. No. 10/438,716, which is incorporated herein by reference.

Since conversation 106 can correspond to one or more conversations, the relation CorrespondsTo indicates that the related conversations have the same global unique ID. For example, if conversation 106 contained by a first service corresponds to conversation 104 hosted by second service, then all the messages that are included in conversation 106 and that either originate from or are sent to the second service are also included in conversation 104. If there are no such messages common to conversation 106 and conversation 104, then there are some other conversations that correspond to conversations 106 and 104 that provide a string of corresponding conversations in which each link of the string is made of a correspondence relationship that includes at least one common message. Other features that can be included in Managed Object Interface Collection 152 are described in the disclosure entitled "System and Method for Managing Information Technology Resources," U.S. patent application Ser. No. 10/438,662, which is incorporated herein by reference.

Referring to FIGS. 1A and 1B, in some embodiments, managed object interfaces 150 and conversation interfaces 112, 114 are exposed to manager 102 through interface descriptions 118. Interface descriptions 118 can provide a framework for creating management services for all managed objects 148 regardless of the resources they represent by defining the interfaces in a common format recognized by other managed objects 148 and manager 102. In one embodiment, interface descriptions 118 define the interfaces to Web Services Description Language (WSDL). Other suitable formats can be utilized.

Interface descriptions 118 implemented in WSDL typically define schemas for messages and corresponding WSDL parts; port types; marker attributes; and namespaces.

Port types describe a list of potential management capabilities for manager 102. Managed objects 148 can implement management interfaces for some or all of the port types defined in interface descriptions 118. Managed objects 148 can also use interface descriptions 118 to expose different interfaces to different managers 102. Examples of WSDL interface descriptions 118 suitable for use with some embodiments of Conversation Interface Collection 116 and Managed Object Interface Collection 152 described herein are provided in the Appendix filed with this disclosure.

Extensions can be implemented to conversation interfaces 112, 114, and managed object interfaces 150 to manage additional aspects of the resources associated with conversation managed objects 108, 110, and managed object 148. In some embodiments, marker attributes for new management port types can be added to corresponding interface descriptions 118 to indicate additional management aspects of managed object 148 and conversation managed objects 108, 110 to manager 102.

For example, conversation interfaces 112, 114 can provide generic operations such as GetStartDate, but do not assume that a choreography, such as a web services choreography interface (WSCI), is provided that describes the legal sequence of messages in conversations 104, 106. Web Service Choreography Interface (WSCI) is an XML-based language that describes the flow of messages exchanged by a Web service in the context of a process. WSCI allows the description of the observable behavior of a Web service in a message exchange. Interface descriptions 118 allow operations to define the direction of messages (incoming or outgoing), and WSCI describes the behavior of the service involving multiple individual operations, e.g., how a Web service participates in a message exchange.

To define and manage a message choreography, conversation interfaces 112, 114 and interface descriptions 118 can be extended to include the choreographic capabilities in a new portType, with operations such as GetCurrentStep. As a result, conversation managed objects 108, 110 that utilize the choreography implement respective conversation interfaces 112, 114, and the extra portType(s) defined to expose the choreographic capabilities of conversation managed objects 108, 110. In this manner, a manager 102 that is not aware of the choreography could still manage conversation managed objects 108, 110 because manager 102 would recognize the exposed conversation interfaces 112, 114. A manager 102 that is aware of the choreography and the corresponding management portTypes can make full use of the management functionalities of conversation managed objects 108, 110 by accessing conversation interfaces 112, 114 and the new portType(s).

In the embodiments shown, manager 102, conversation 104, conversation managed objects 108, 110, conversation interfaces 112, 114, discovery agencies 120, managed object interfaces 122, 124, and managed objects 148 are implemented in computer processing systems 160 through 168, respectively.

Processing systems 160 through 168 can be any suitable computer-processing device that includes memory for storing and executing logic instructions, and is capable of interfacing with other processing systems. In some embodiments, processing systems 160 through 168 can also communicate with other external components via network 170. Various input/output devices, such as keyboard and mouse (not shown), can be included to allow a user to interact with components internal and external to processing systems 160 through 168.

Additionally, processing systems 160 through 168 can be embodied in any suitable computing device, and so include personal data assistants (PDAs), telephones with display areas, network appliances, desktops, laptops, X-window terminals, or other such computing devices. Processing systems 160 through 168 and corresponding logic instructions can be implemented using any suitable combination of hardware, software, and/or firmware, such as microprocessors, Field Programmable Gate Arrays (FPGAs), Application Specific Integrated Circuit (ASICs), or other suitable devices.

Logic instructions executed by processing systems 160 through 168 can be stored on a computer readable medium, or accessed by processing systems 160 through 168 in the form of electronic signals. Processing systems 160 through 168 can be configured to interface with each other, and to connect to external network 170 via suitable communication links such as any one or combination of T1, ISDN, or cable line, a wireless connection through a cellular or satellite network, or a local data transport system such as Ethernet or token ring over a local area network.

Figure 2:
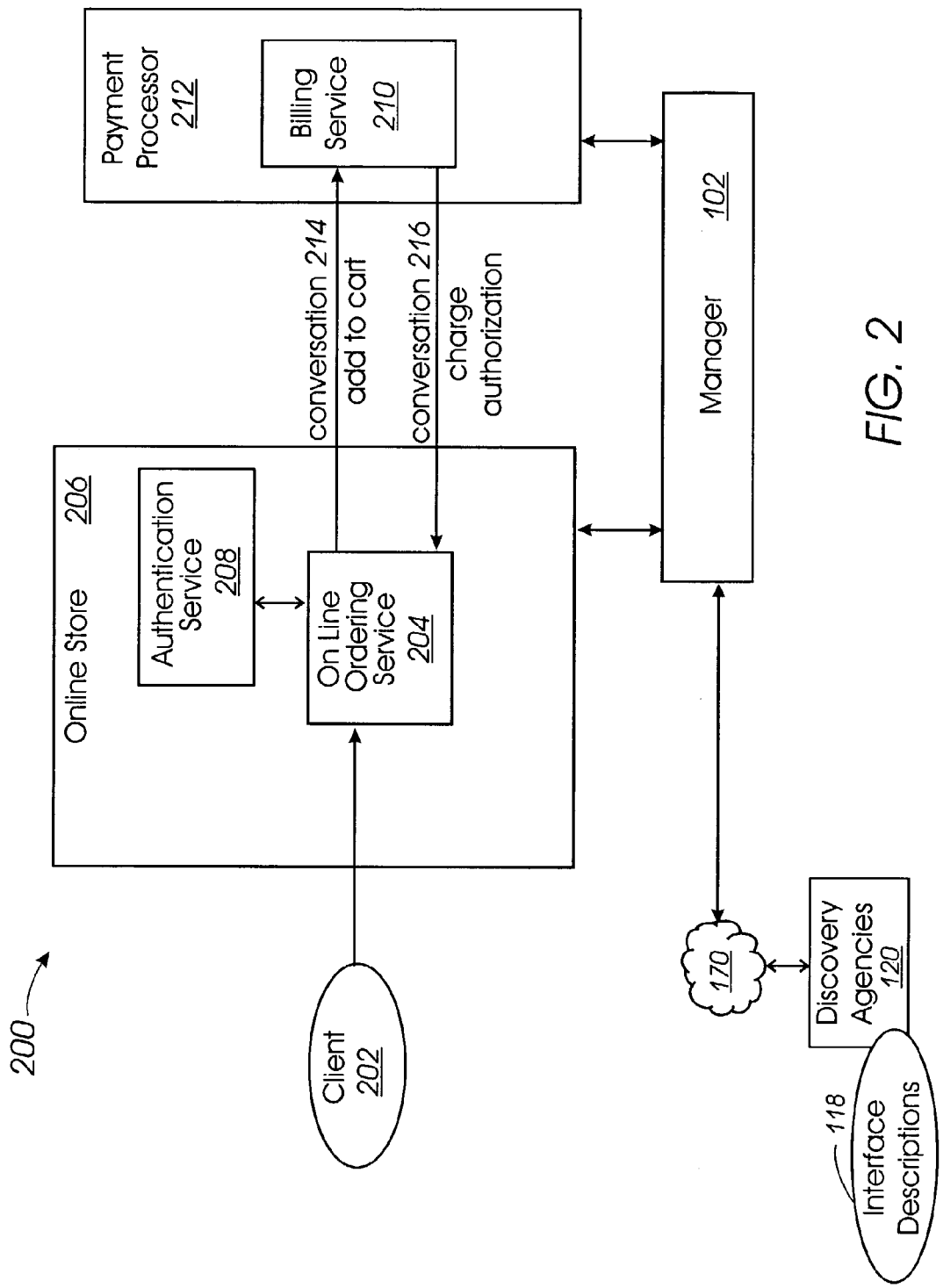
FIG. 2 shows a diagram of components included in an embodiment of an online shopping service system that can utilize the conversation management system of FIG. 1A.

FIG. 2 shows a diagram of components included in an embodiment of an online shopping service system 200 that can utilize conversation management system 100 (FIG. 1A). A purchaser, referred to as client 202, accesses online ordering service 204 at online store 206 via a suitable interface through a network, typically using SOAP or other suitable messages. Online store 206 includes authentication service 208 and online ordering service 204. Online ordering service 204 accesses authentication service 208 and billing service 210. Billing service 210 is implemented by a third party in payment processor 212. Information regarding transactions, such as the amount to be charged and credit card charge authorizations, can be exchanged via conversations 214, 216 between online ordering service 204 and billing service 210. Manager 102 is configured to manage conversations 214, 216.

Authentication service 208 authenticates user identification information and enables users to access information previously supplied to make purchases. Billing service 210 allows the purchaser to pay with a credit card or checking account for one or more items. Payment processor 212 then sends the payment to the vendor's account.

Figure 3:
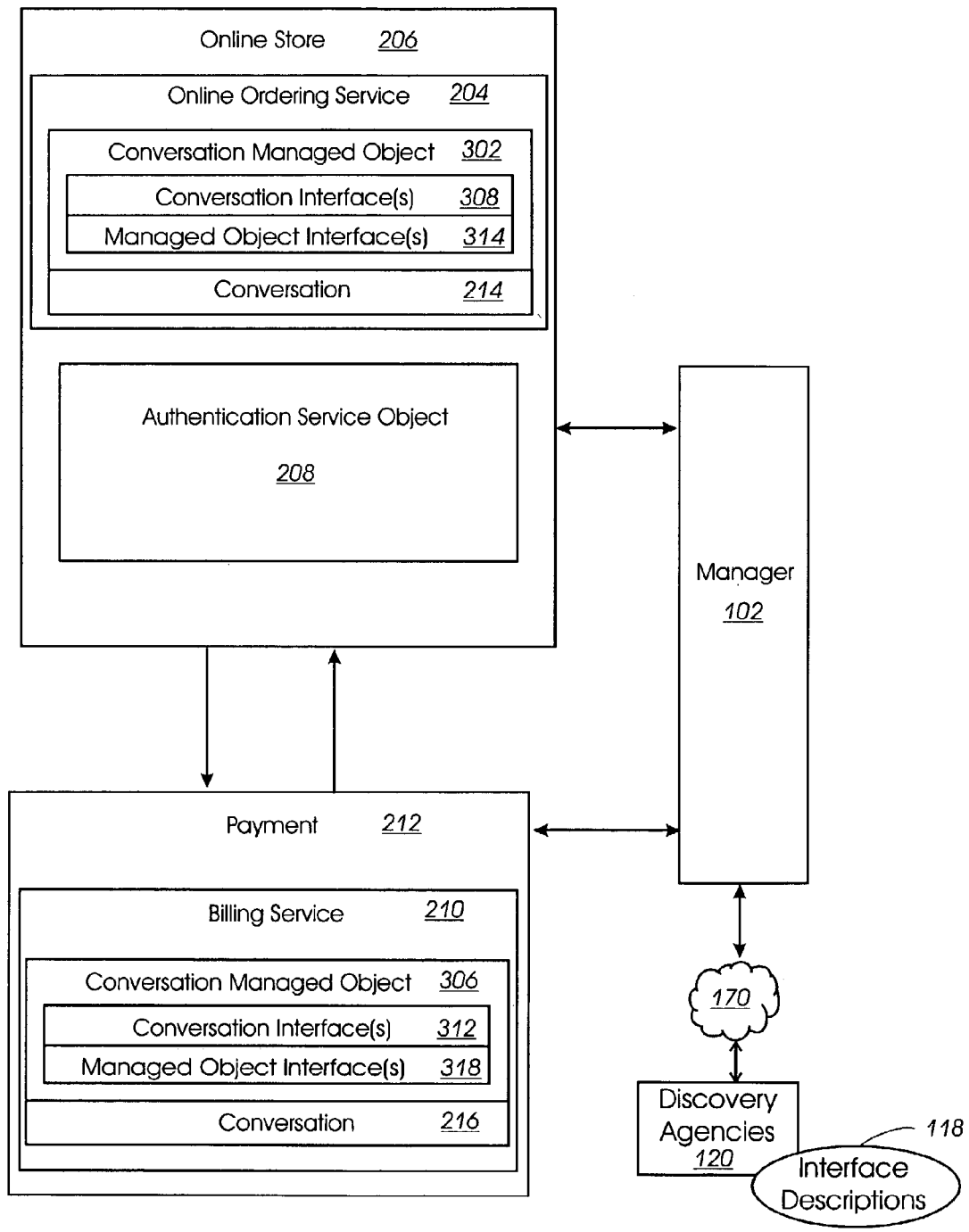
FIG. 3 shows a block diagram of components in online shopping service system of FIG. 2 configured with conversation and managed object interfaces.

Referring to FIGS. 2 and 3, FIG. 3 shows a block diagram of conversations 214, 216 containing conversation managed objects 302, 306. Conversation managed objects 302, 306 are configured with conversation interfaces 308, 312, and managed object interfaces 314, 318, respectively. Manager 102 can discover interface descriptions 118 to learn about the management capabilities available for conversation interfaces 308, 312, and managed object interfaces 314, 318. The management capabilities can include features discussed herein for the embodiments of conversation interface collection 116 (FIG. 1A) and managed object interface collection 152 (FIG. 1B), as well as any extended resource management capabilities that can be included in an implementation.

The capability to monitor conversations 214, 216 allows manager 102 to determine the status of transactions between online ordering service 204 and billing service 210, to determine whether conversation 214 or 216 has faulted, and to alert an administrator of the corresponding online ordering service 204 or billing service 210 when a problem with conversation 214 or 216 occurs.

The logic modules, processing systems, and circuitry described here may be implemented using any suitable combination of hardware, software, and/or firmware, such as Field Programmable Gate Arrays (FPGAs), Application Specific Integrated Circuit (ASICs), or other suitable devices. Similarly, other components have been discussed as separate and discrete components. These components may, however, be combined to form larger or different logic modules, integrated circuits, or electrical assemblies, if desired.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the components and their arrangement are given by way of example only. The configurations can be varied to achieve the desired structure as well as modifications, which are within the scope of the invention. Variations and modifications of the embodiments disclosed herein may be made based on the description set forth herein, without departing from the scope of the invention as set forth in the following claims.

In the claims, unless otherwise indicated the article "a" is to refer to "one or more than one".

We claim:

1. A system for managing a conversation in a Web service, comprising:
   a computer processor;
   a conversation managed object executable on the computer processor, wherein:
      the conversation managed object includes at least one interface configured to provide management information about the conversation to at least one manager; and
      the at least one interface is configured to provide information regarding the Web service that contains the conversation.

2. The system of claim 1, wherein the at least one interface is configured to provide a list of other managed objects participating in the conversation.

3. The system of claim 1, wherein the at least one interface is configured to provide an identifier associated with the conversation.

4. The system of claim 1, wherein the at least one interface is configured to provide information regarding the last message received by the conversation.

5. The system of claim 1, wherein the conversation is further configured to receive messages, and the at least one interface is configured to provide information regarding the last fault message returned from the conversation.

6. The system of claim 1, wherein the at least one interface is configured to provide information regarding the number of other Web service managed objects involved in the conversation.

7. The system of claim 1, wherein the conversation is further configured to receive messages, and the at least one interface is configured to provide information regarding the number of successful messages processed by the conversation.

8. The system of claim 7, wherein the conversation is further configured to receive messages, and the at least one interface is configured to provide information regarding the number of failed messages processed by the conversation.

9. The system of claim 8, wherein the at least one interface is configured to provide information regarding the total number of messages for the conversation.

10. The system of claim 8, wherein the messages are exchanged via a simple object access protocol (SOAP).

11. The system of claim 1, wherein the at least one interface is configured to allow the at least one manager to end the conversation.

12. The system of claim 1, wherein the at least one interface is configured to provide information regarding the total number of failed messages processed by the conversation.

13. The system of claim 1, wherein the conversation managed object is configured to notify the at least one manager when an incorrect message is received.

14. The system of claim 1, wherein the conversation managed object is configured to notify the at least one manager when at least one of: a message could not be sent to a participant in the conversation, and an expected response was not received.

15. The system of claim 1, wherein the conversation managed object is configured to notify the at least one manager when one of the participants in the conversation sent an unexpected fault message.

16. The system of claim 1, wherein the conversation managed object is configured to notify the at least one manager when a fault happened while processing a message for the conversation.

17. The system of claim 1, further comprising an interface description that describes the at least one conversation interface to the at least one manager.

18. The system of claim 17, wherein the interface description is formatted according to a Web services description language (WSDL).

19. A system capable of monitoring messages between a first resource and a second resource, comprising:
   a computer processor configured to communicate with the first resource, wherein the computer processor includes executable instructions operable to:
      discover whether a conversation has been established between the first resource and the second resource;
      end the conversation; and
      request information regarding the conversation including:
      at least one of:
         the number of failed messages;
         the number of successful messages;
         the total number of messages;
         the last message received by the first resource;
         the last fault message received by the first resource; and
      at least one of:
         the identity of resources participating in the conversation;
         the number of resources participating in the conversation;
         an identifier of the conversation; and
         an identifier of the resource that contains the conversation interface.

20. The system of claim 19, wherein the messages are exchanged via the simple object access protocol (SOAP).

21. The system of claim 19, wherein a manager discovers whether the conversation has been established between the first resource and the second resource through an interface, wherein the interface comprises:
   a managed object interface that includes information regarding the first resource; and
   a conversation interface that includes information regarding the messages exchanged with the first managed object.

22. The system of claim 21, wherein the first resource is associated with at least one of the group of:
   a first interface description that describes the managed object interface to a manager; and
   a second interface description that describes the conversation interface to a manager.

23. The system of claim 22, wherein descriptions of at least one of:
   the first interface description and the second interface description are formatted according to a Web services description language (WSDL).

24. A computer program product tangibly embodied in a computer storage readable medium, comprising:
   a conversation interface;
   a managed object interface associated with the conversation interface, wherein the conversation interface includes information for monitoring messages in a conversation, including:
   at least one of:
      the number of failed messages;
      the number of successful messages;
      the total number of messages;
      the last message received by a resource;
      the last fault message received by the resource; and
   at least one of:
      the identity of resources participating in the conversation;
      the number of resources participating in the conversation;
      an identifier of the conversation; and
      an identifier of the resource that contains the conversation interface.

25. The computer program product of claim 24, wherein the conversation interface further includes information regarding at least one of the following events:
   receipt of an incorrect message;
   an expected response was never received;
   a participant in the conversation is not responding;
   a participant in the conversation sent a fault message; and
   a fault occurred while processing a message for the managed service.

26. The computer program product of claim 25, wherein the messages are exchanged via the simple object access protocol (SOAP).

27. The computer program product of claim 26, further comprising a conversation interface description that describes the conversation interface to a manager.

28. The computer program product of claim 27, further comprising:
   an extension to the conversation object interface to expose additional conversation management capabilities to a manager.

29. The computer program product of claim 28, wherein the conversation interface description is formatted according to a Web services description language (WSDL).

30. The computer program product of claim 29, wherein the extension to the conversation interface is implemented by including another port type in another interface description.

31. The computer program product of claim 30, wherein the extension to the conversation interface exposes management information regarding a business transaction.

32. A method for managing a conversation for a Web service, comprising:

creating a conversation object representing the conversation;
exposing management capabilities for the conversation via a description of a plurality of interfaces; and
allowing a manager to subscribe with the conversation object to receive notification of events regarding the conversation.

33. The method of claim 32 further comprising:
storing information regarding the conversation including:
at least one of:
  the number of failed messages;
  the number of successful messages;
  the total number of messages received;
at least one of:
  the identity of other resources participating in the conversation;
  the number of other resources participating in the conversation;
  an identifier of the conversation; and
at least one of:
  the last message received;
  the last fault message received; and
  an identifier of the Web service that contains the conversation.

34. An apparatus for managing a conversation for a Web service, comprising:
object means for representing the conversation;
description means for exposing management capabilities for the conversations; and
subscription means for allowing a manager to subscribe to receive notification of events regarding the conversation.

35. The apparatus of claim 34 further comprising:
means for providing information regarding the conversation including:
  the messages processed; and
  other resources participating in the conversation.

* * * * *